Nov. 27, 1945.   T. R. PAULSON   2,390,030
CHILLING CABINET
Filed Jan. 12, 1942   3 Sheets-Sheet 1
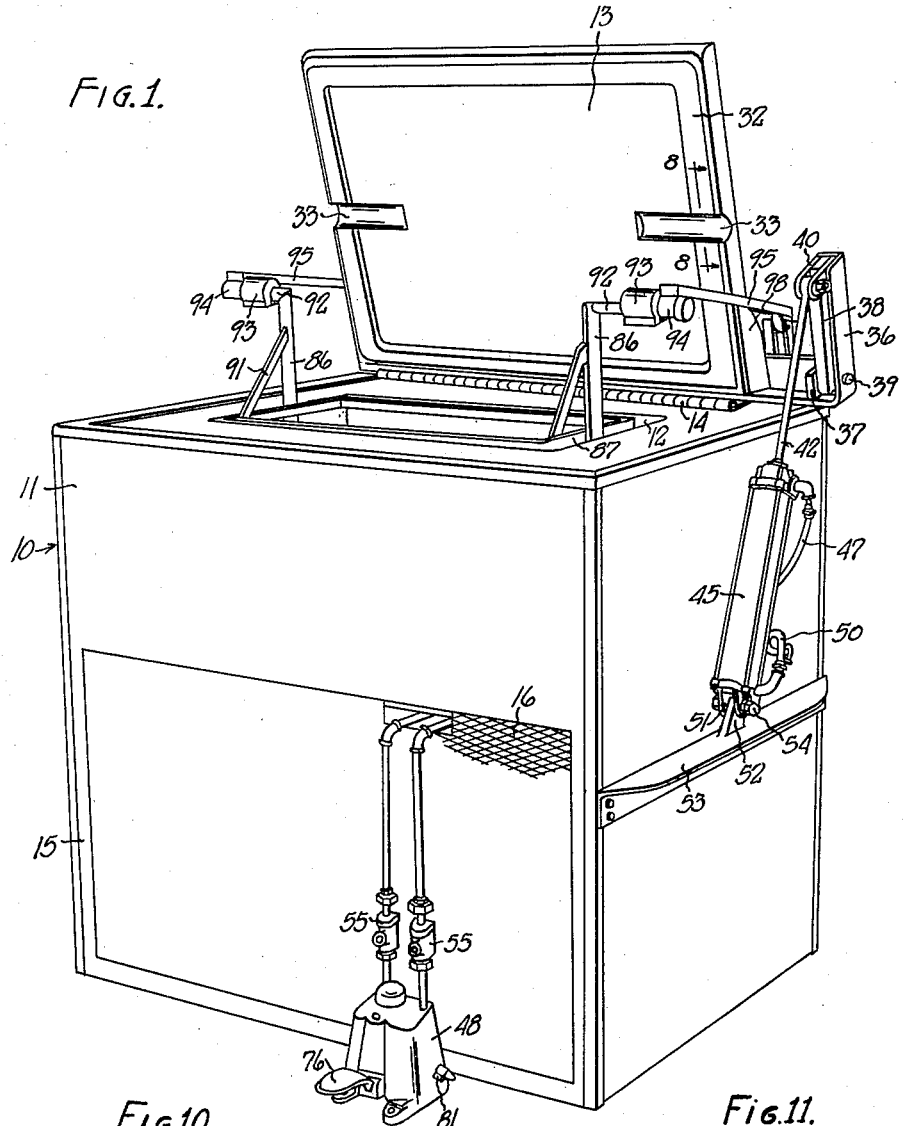
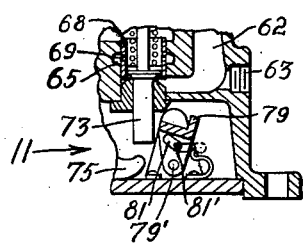
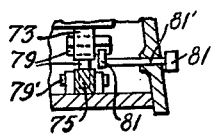
INVENTOR.
THEODORE R. PAULSON
BY Oltsch & Knoblock
Attorneys.

Nov. 27, 1945. T. R. PAULSON 2,390,030
CHILLING CABINET
Filed Jan. 12, 1942 3 Sheets-Sheet 2
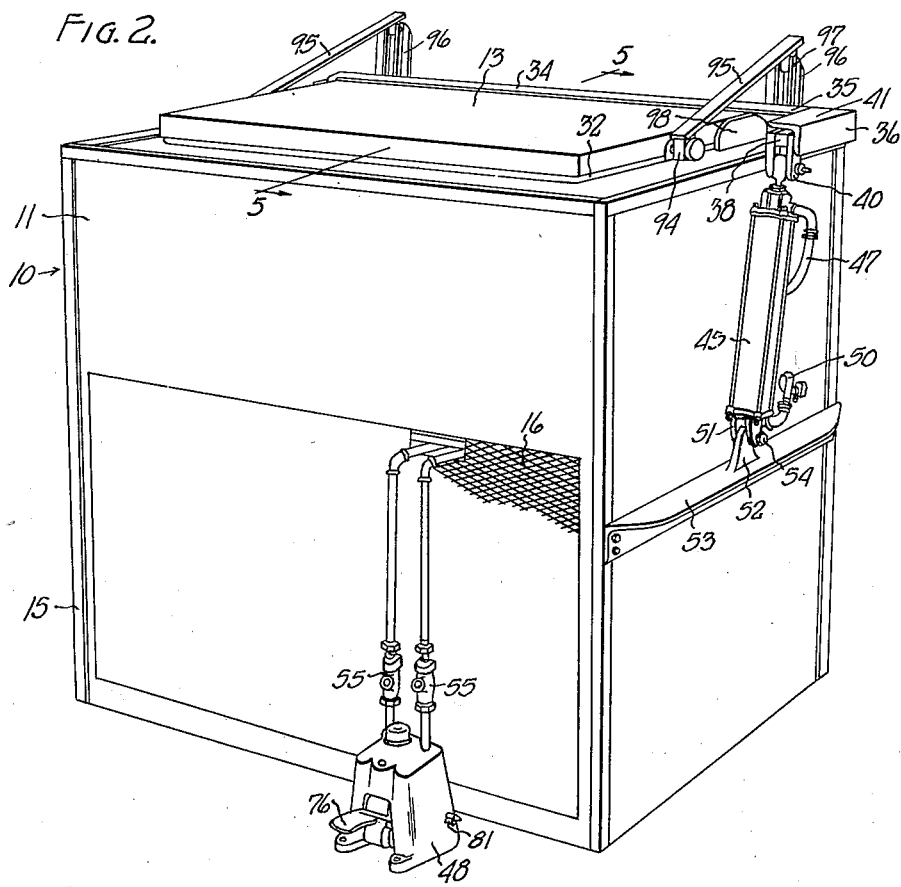
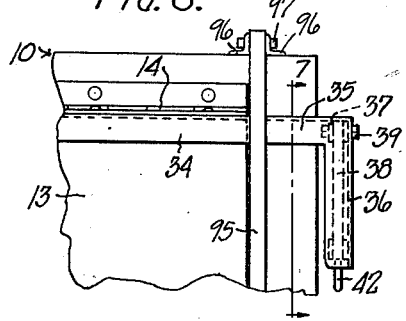
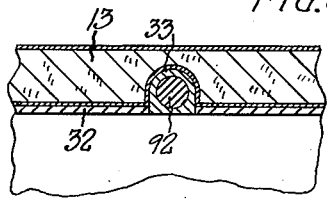
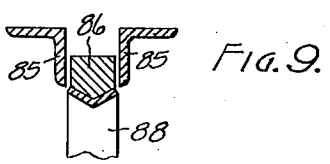
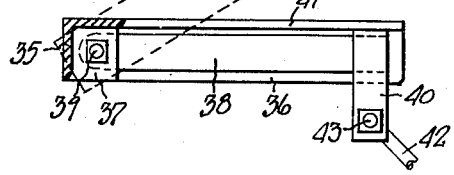
INVENTOR.
THEODORE R. PAULSON
BY Oltsch & Knoblock
Attorneys.

Nov. 27, 1945.  T. R. PAULSON  2,390,030
CHILLING CABINET
Filed Jan. 12, 1942  3 Sheets-Sheet 3

INVENTOR.
THEODORE R. PAULSON
BY Oltsch & Knoblock
Attorneys.

Patented Nov. 27, 1945

2,390,030

UNITED STATES PATENT OFFICE 2,390,030

CHILLING CABINET

Theodore R. Paulson, South Bend, Ind., assignor to Mid West Sales & Service, Inc., South Bend, Ind., a corporation of Indiana Application January 12, 1942, Serial No. 426,387

8 Claims. (Cl. 312—174)

This invention relates to a chilling cabinet, and more particularly to means by which metal parts may be chilled to any desired extent.

Modern manufacturing technic frequently requires metal parts to be assembled with a friction or "freeze" fit. To facilitate rapid assembly of parts in this manner, the outer part is heated to expand it and the part which fits therein is cooled or chilled frequently to sub-zero temperature to contract it sufficiently to permit insertion thereof in the heated expanded part. The methods heretofore employed to chill parts have generally been objectionable for one or more of the following reasons: requirement for consumption of substantial periods of time to chill the part and to manipulate and handle it after being chilled; danger to workmen; and inability to handle large number of parts for high speed or mass production practices.

The primary object of this invention is to provide a device which overcomes the aforementioned disadvantages and deficiencies of prior devices and methods.

A further object is to provide a device of this character which is simple and rapid in operation and whose use entails minimum danger to workmen.

A further object is to provide a device of this character wherein a work holder is normally immersed in a chilling bath and is elevated above the bath when the device is opened for application to or removal of work from the work holder.

A further object is to provide a device of this character having a liquid tank provided with a closure wherein a work holder is normally immersed in the liquid and power-operated means are provided for simultaneously moving the closure and the work holder in a predetermined relation.

A further object is to provide a chilling cabinet having a pivoted closure shiftable by power-operated means including a separable connector between the closure and the power unit adapted to be disconnected by any force slightly greater than the gravitational force of the closure.

A further object is to provide a device including a liquid tank containing a chilling bath and receiving a vertically shiftable work holder with means for automatically shifting the work holder when a closure for said tank is opened, wherein said work holder is shifted in predetermined relation to said closure to permit effective drainage of liquid from work pieces by the time the closure reaches fully opened position.

A further object is to provide a device of this character including a liquid tank having a closure and a work holder therein with means for shifting the work holder in predetermined relation to the closure upon operation of the closure and means for sealing the closure around said shifting means.

Other objects will be apparent from the description, drawings, and appended claims.

In the drawings:

Fig. 1 is a perspective view of the cabinet in open position.

Fig. 2 is a perspective view of the cabinet in closed position.

Fig. 6 is a fragmentary top plan view of the cabinet.

Fig. 7 is a vertical sectional detail view taken on line 7—7 of Fig. 6.

Fig. 8 is a fragmentary sectional detail view taken on line 8—8 of Fig. 1 and illustrating the closure in closed position.

Fig. 9 is a fragmentary detail sectional view taken on line 9—9 of Fig. 5 and illustrating the guide means for the work holder.

Fig. 10 is a fragmentary detail section view of the control valve, illustrating one adjustment thereof.

Fig. 11 is a fragmentary detail sectional view of the control valve viewed in the direction of the arrow 11 of Fig. 10.

Figure 3:
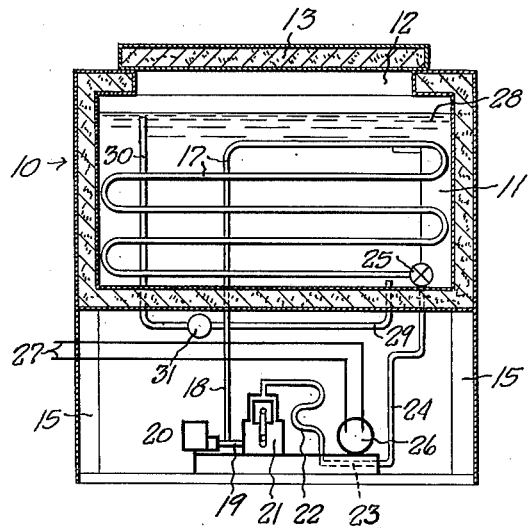
Fig. 3 is a vertical sectional view of the cabinet illustrating the refrigerator means diagrammatically.

Referring to the drawings, which illustrate the preferred embodiment of the invention, the numeral 10 designates a cabinet mounting a suitably insulated liquid containing tank 11 open at its upper end at 12. An insulated closure or cover 13 is pivotally mounted upon the cabinet by means of hinge 14. The tank 11 is supported on frame work 15 at an elevation above the floor or other supporting surface whereby an enclosed space is provided beneath the tank in communication with the atmosphere through a grilled opening 16 for the reception of any suitable mechanical refrigerating apparatus.

A conventional refrigerating system is illustrated in Fig. 3. This system includes an evaporator in the nature of a coil 17 connected by a suction line 18 with a conduit 19 connecting a low pressure control element 20 with a condensing unit 21 in the nature of a cylinder and piston arrangement provided with a suitable discharge valve (not shown). The high pressure line from the condenser discharge valve includes a condenser coil 22, receiver 23, and a high pressure conduit 24 connected with the coil 17 and provided with a thermostatic expansion valve 25. The refrigerating units is operated by suitable electrical motor 26 to which leads 27 are connected.

The tank is adapted to be filled to a level above the upper level of the coil 17 with a liquid 28. This liquid may be alcohol. A conduit 29 may be connected with the tank 11 adjacent the bottom thereof at one corner of the cabinet and also connected by a portion 30 terminating slightly below the normal liquid level of the container at an opposite corner of the tank. A suitable pump 31 may be interposed in the conduit 29 for the purpose of effecting circulation of the liquid 28 through the conduit 29. The cover 13 of the container is provided with a marginal gasket strip 32 adapted to bear upon the upper end of the cabinet 10 around the opening 12 therein. At the opposite sides of the cover and extending parallel to the hinge 14 substantially at the middle of the cover are provided elongated depressions or grooves 33 in the lower face of the cover 13. These grooves 33 interrupt the gasket 32 and the purpose thereof will be set out more fully hereinafter. An angle iron 34 is fixedly secured to the rear edge of the cover 13 and projects laterally from the cover 13 at 35 to terminate in laterally outwardly spaced relation to the adjacent end of the cabinet 10. An arm 36 is rigidly connected to the projection 35 and extends parallel to the adjacent end of the cabinet. A block 37 is welded or otherwise secured to the angle iron 34 in spaced relation to the arm 36 and an arm 38 is pivoted by a bolt 39 between the outer wall of the arm 36 and said block 37. At its outer end the arm 38 carries a pair of depending ears 40 normally bearing against the upper flange 41 of the arm 36 and receiving therebetween one end of an elongated piston rod 42 which is pivoted thereto at 43.

Piston rod 42 is rigid and elongated and is carried by a suitable piston 44 having a fluid-tight sealing fit within a compressed air cylinder 45. Cylinder 45 is provided with a port 46 at one end thereof connected by means of a line 47 with one port of a control valve 48. The opposite end of cylinder 45 is provided with a port 49 connected by a conduit 50 with another port of the control valve 48. The cylinder 45 is normally disposed in vertically inclined position, and is provided at its lower end with a pair of apertured ears 51 adapted to span a lug 52 mounted upon a horizontal cross support 53 carried by the cabinet 10 at the end thereof. Ears 51 are pivoted to lug 52 at 54. Each of the lines 47 and 50 preferably has a speed control valve 55 interposed therein, said speed control valve comprising a casing provided with chambers 56 and 57 separated by a partition having one small and one large opening therein for communication between said chambers. The small opening is provided with a needle valve 58 for permitting a restricted flow of air therethrough in either direction while the large opening accommodates a spring ball valve 59 permitting passage of air through the large port in one direction only.

The controlling valve 48 has a housing provided with an intake chamber 60 adapted to be connected at port 61 with a compressed air line, an exhaust air chamber 62 open to atmosphere at port 63, a chamber 64 connected with line 50 and a chamber 65 connected with line 47. Each of the chambers 60—62—64, and 65 is in communication with a central cylindrical chamber extending axially of the valve housing. A cylinder 66 provided with one or more ports 67 is mounted in said central cylindrical chamber for communication at its ends with the chambers 60 and 62 and for communication of said ports 67 with the chamber 64. Similar cylinder 68 is mounted in axial alignment with cylinder 66 and has port 69 therein communicating with chamber 65, the opposite ends of cylinder 68 being open to chambers 60 and 62. An elongated shaft 70 passes centrally through the cylinders 66 and 68 and mounts a pair of spaced valve discs 71 intermediate its ends with the spacing of the discs 71 being greater than the spacing of the ports 67 and 69 in cylinders 66 and 68. A spring 72 normally urges the shaft 70 in a downward direction. The lower end 73 of shaft 70 projects into a chamber 74 in the lower end of the valve housing and into the path of pivotal movement of the inner end portion 75 of a foot pedal 76 pivoted to the housing at 77 and normally urged into the position illustrated in Fig. 4 by the spring 78. Suitable latching means 79 pivoted to the housing at 79' is pressed upon by a spring 80 to hold the same in desired position illustrated by the setting of a latch lever 81. Latch lever 81 is mounted on a rotatable shaft 81' extending through the valve housing and may be adjusted in either of two positions, one position being that illustrated in full lines in Fig. 4 and the other being a position at 180° displaced whereby the latching nose 82 of the latch member is disengaged from the end of the shaft 73.

Figure 4:
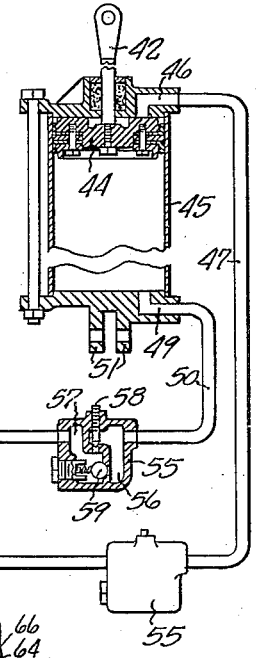
Fig. 4 is a sectional view of the power-operated closure actuating means wherein the control valve is shown on a larger scale than the remaining parts of the system.

The operation of the air valve may be arranged in either of two cycles depending upon the positioning of the latch 81. Thus, when the latch lever is in the position illustrated in Fig. 4, depression of the foot pedal 76 will urge the shaft 70—73 and its associated valve discs 71 into up position as illustrated in Fig. 4 with the latch 79 holding said shaft in that position. In the up position, the valve discs 71 are both positioned above the ports 67—69 adjacent thereto, so that air from chamber 60 passes into cylinder 66, through port 67 and into the chamber 64 and line 50 for discharge through port 49 into the cylinder 45 to urge the piston 44 to its uppermost position for opening the closure 13 to the position illustrated in Fig. 1. During the upward movement of the piston 44, the air in cylinder 45 above said piston is exhausted through port 46, line 47, chamber 65, port 69, cylinder 66, chamber 62, and exhaust port 63 by virtue of the position of the lower valve disc 71 above port 69 of cylinder 68. Note in this connection that the passage of air through line 50 is restricted to that small rate or volume which may pass the needle valve 58, whereas the air discharged through line 47 can unseat the ball valve 59 for quick release and discharge. On depressing the foot pedal a second time, the latch 79 is engaged and tilted by end portion 75 of said pedal for disengagement thereof from the shaft portion 73 to permit said shaft portion to move to its down position under the influence of spring 72 whereupon a reverse flow of air to that above described will be established to move the piston 44 downward. Note in this connection that the latch 79 is pivoted less than 180° during this operation and moves between the position illustrated in full lines in Fig. 4 and a position clear of the path of travel of the shaft 73. When the latch lever 81 is moved 180° the latch 79 is tilted thereby, and held clear of shaft 73 and a two cycle mode of operation is provided wherein depression of the pedal 76 urges the piston to its up position and release of the pedal permits the spring 72 to urge the piston to its downward position.

Vertical guides 85 are mounted within the tank 11 at opposite ends thereof and in spaced relation and receive therebetween in guided relation the uprights 86 of any suitable work holder 87. As here illustrated the work holder 87 is in the form of a basket of open construction upon whose bottom slats 88 work may be supported for retention in desired position by its side slats 89 and end bars 90. Diagonal reinforcing members 91 may be provided to rigidify the construction of the work holder. The uprights 86 at opposite ends of the work holder are preferably of such a length that when the work holder is supported upon the bottom of the tank 11 the upper ends thereof will extend slightly above the upper surface of the tank and will be received within the recesses 33 formed in the lower face of the cover 13. A pair of aligned shafts 92 project laterally outwardly from the upper ends of the uprights 86 of the work holder 87 and preferably mount compressible gasket means 93 thereon. These gasket means are so constructed and shaped that when the closure 13 rests upon the top of the tank 11, with its marginal gaskets 32 sealing said closure, the lower face of the gasket 93 will bear upon the top wall of the tank 11 and the upper portion of the gasket 93 will be pressed upon by the closure 13 at the concave or recessed portion 33 thereof. This sealing arrangement is best illustrated in Fig. 8 wherein it will be observed that the gasket 93 seats snugly between the ends of the marginal gasket 32 guided by the cover and that the shaft 92 at each end of each work holder 87 passes clear of both the top of the tank 11 and of the bottom of the cover 13.

At their outer ends, the shafts 92 mount journals 94 carried by the ends of elongated bars 95 which extend rearwardly of the tank in parallel relation and on opposite sides of the closure 13. Uprights 96 are rigidly secured to the back of the tank 11 and extend thereabove and the rear ends of bars 95 are pivoted to the upper ends of uprights 96 at 97.

Figure 5:
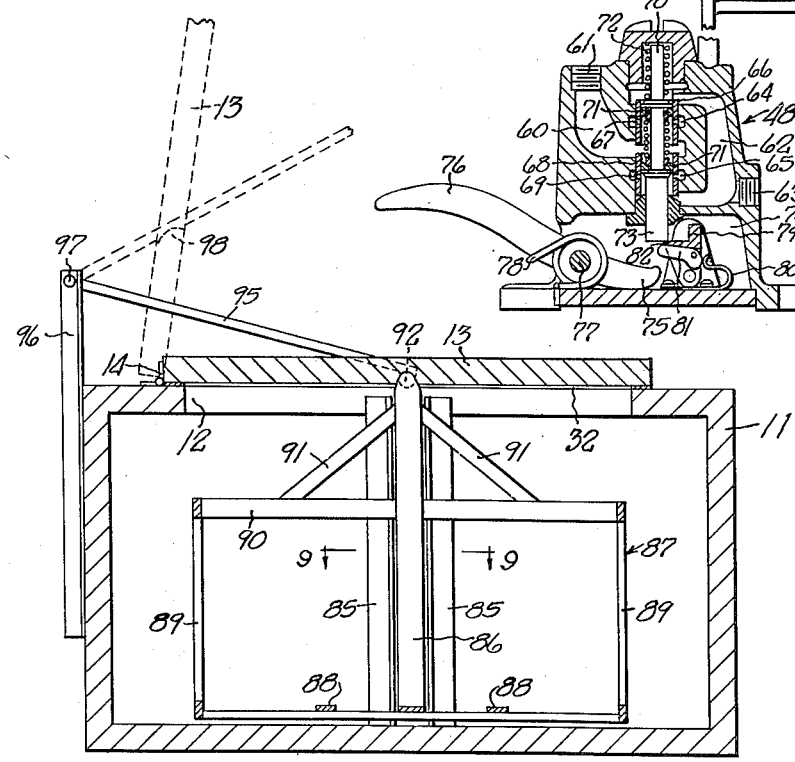
Fig. 5 is a vertical sectional view of the cabinet taken on line 5—5 of Fig. 2.

At each end of the closure 13 is provided a cam 98 positioned in vertical alignment with the adjacent bar 95. Cams 98 are so arranged and positioned with relation to the cover 13 and to bars 95 that they engage the under sides of the bars 95 when the closure 13 has been raised to a predetermined position whereby further opening of the closure will pivot arms 95 about point 97 to approximately the dotted line position illustrated in Fig. 5 and to the full line position shown in Fig. 1. It will be observed that the cam is so shaped and arranged that the initial movement of the arm 95 thereby will be slow, the intermediate movement thereof will be accelerated, and the concluding movement thereof will be slow.

When the device has been properly constructed and valve 48 has been connected to a source of compressed air and the tank 11 has been filled to proper level with a liquid of the proper character, for example alcohol, and the refrigerator mechanism has been connected for operation, the device is ready for use. A quantity of work pieces to be chilled is inserted in the work holder 87 and the refrigerator mechanism is permitted to operate for a period sufficient to reduce the temperature of the liquid 28 to proper chilling temperature. When the parts have been chilled sufficiently for use, the operator may depress the pedal 76 of the valve 48 whereupon the piston 44 in cylinder 45 is urged upwardly to raise the forward upper end of the lever 38 normally received in arm 36 to thereby open the cover 13 of the tank 11. During the opening movement of the cover 13 cam 98 engages the arms 95 to pivot the same upwardly and thereby elevate the work holder to a position above the level of the liquid in said tank. By virtue of the cam formation which produces an elevated movement of the work holder beginning slowly, then accelerating, then decelerating as the closure approaches fully opened position, the liquid 28 is permitted to drain from the work piece on the work holder so that all excess liquid has dripped from said work piece by the time the workman is ready to grasp the work piece. Hence, the danger to the workman resulting from handling the chilled parts is reduced to a minimum. When the parts have been removed from the work holder, the workman shifts the pedal 76 of valve 48 to permit reclosing of the container cover by the piston 44 in cylinder 45. The usual temperature to which parts are chilled ranges from —10° to —20°. These low temperatures necessitate care in handling of the parts and avoidance of contact by the operator with liquid at that temperature whether the operator works with or without gloves.

An additional safety factor of the instant device which is worthy of particular attention is the pivot mounting of the arm 38 which is connected to the rod 42 with respect to the arms 35 and 36 which are rigidly connected to the closure 13. It will be observed that this arrangement permits disconnection of the cover 13 from the pneumatic operating device, so that if the hands of the operator should accidentally be placed under the closure 13 and the top of the tank, the force applied or exerted upon the hands will be equal to that applied by the cover 13 only, incident to its weight. In other words, should such a condition exist, the lever 38 is free to pivot about point 39 while the closure 13 remains in any fully or partly open position. It will be observed that the weight of the cover 13 will normally apply sufficient force to the arm 36 rigid therewith so that said arm will follow the movements of the pivotally connected lever 38.

Attention is also directed to the agitating effect of movement of the work holder 87 upon the liquid incident to the operation of the device In other words, as the work holder 87 is raised and lowered each time the device is operated, the liquid will be agitated sufficiently to insure that all thereof is at substantially uniform temperature and that temperature stratification will not be permitted.

I claim:

1. A chilling cabinet comprising a container having an opening in its top, a closure pivoted to said container to span said opening, a work holder in said container, an elongated arm pivoted to said container and to said work holder and a cam carried by said closure and engageable with said arm to elevate said arm and work holder when said closure is opened, said cam being spaced from said arm when said closure is closed.

2. A chilling cabinet comprising a container having a top opening, a top closure pivoted to said container, a work holder in said container, an arm pivoted to said container and to said work holder and including a portion positioned adjacent and above one side of said closure, and a cam projecting laterally from said closure in vertical alignment with and normally spaced below said arm, said cam engaging said arm intermediate open and closed positions of said closure.

3. A chilling cabinet having a top opening, a top closure pivoted to said cabinet, a work holder in said cabinet, a laterally outwardly projecting member carried by the upper end of said work holder, the lower surface of said closure having a recess receiving said member, an arm pivoted to said cabinet and pivotally connected to the outer end of said member, and means fixedly carried by said closure and engageable with the bottom face of said arm for pivoting said arm upon pivoting of said closure.

4. A chilling cabinet comprising a tank open at its top and adapted to contain a chilling liquid, a closure pivoted to said tank for closing said tank opening, power actuated means for pivoting said closure, a work holder reciprocable vertically in said tank and normally positioned within said tank, an arm pivoted to said cabinet at a level above said closure in its closed position, means for suspending said work holder at the free end of said arm, and a member carried by said closure and spaced below said arm in the closed position of said closure, said member engaging said arm as said closure opens.

5. A chilling cabinet comprising a container open at its top, a pivoted top closure for said container, power operating means for pivoting said closure, a work holder, vertical guides in said container engaged by said work holder, shiftable means for suspending said work holder, and means carried by said closure and engageable with said suspending means in a restricted range only of the pivotal movement of said closure for shifting said work holder in predetermined timed relation to the movement of said closure.

6. A chilling cabinet comprising a liquid containing tank having a top opening, a top closure pivoted to said tank, a work holder normally positioned within said tank and having a laterally outwardly extending projection at its upper end, said closure having a recess receiving said projection, an arm pivoted to said cabinet and to said projection, means projecting from said closure for engagement with the bottom face of said arm upon movement of said closure, and means for sealing said recess around said projection.

7. A chilling cabinet having a top opening, a top closure pivoted to said cabinet, a rigid arm including a portion projecting laterally from and a portion extending alongside one side of said closure, a link underlying said last named arm portion and pivoted to said last named arm portion adjacent to the pivot axis of said closure, power operating means for actuating said cover connected with the free end of said link, said means being positioned below the level of said closure.

8. A chilling cabinet having a top opening, a top closure pivoted to said cabinet, a rigid member projecting laterally from said closure and including an outer part extending alongside one side of said closure, a power operated unit carried by said cabinet below said closure, and a link pivoted to the outer part of said projecting member substantially in alignment with the pivot axis of said closure and connected at its free end with said power unit, said link normally engaging the bottom of the outer part of said projecting member.

THEODORE R. PAULSON.